United States Patent [19]
Carroll et al.

[11] Patent Number: 4,820,414
[45] Date of Patent: Apr. 11, 1989

[54] CYCLONE SEPARATOR

[75] Inventors: Noel Carroll, Sherbrooke Road, Sherbrooke, Victoria 3789; Gavan J. J. Prendergast, Glen Iris, both of Australia

[73] Assignee: Noel Carroll, Victoria, Australia

[21] Appl. No.: 758,643

[22] PCT Filed: Oct. 5, 1984

[86] PCT No.: PCT/AU84/00195
§ 371 Date: Aug. 26, 1985
§ 102(e) Date: Aug. 26, 1985

[87] PCT Pub. No.: WO85/01454
PCT Pub. Date: Apr. 11, 1985

[30] Foreign Application Priority Data
Oct. 6, 1983 [AU] Australia .......................... PG1721/83
Jan. 24, 1984 [AU] Australia .......................... PG3312/84

[51] Int. Cl.$^4$ ........................................... B01D 17/038
[52] U.S. Cl. ................................. 210/512.1; 209/144; 209/211
[58] Field of Search ............................ 210/788, 512.1; 209/144, 211

[56] References Cited
U.S. PATENT DOCUMENTS 2,538,870  1/1951  Hunter ................................. 210/788
4,237,006 12/1980  Colman et al. ....................... 210/788
4,578,199  3/1986  Peel et al. ............................ 210/788

Primary Examiner—Frank Sever
Attorney, Agent, or Firm—Ladas & Parry

[57] ABSTRACT

A cyclone separator (10) for liquids having a denser liquid component outlet (23) and a less dense liquid component outlet (32). In order to improve separation efficiency a third outlet (54), for the less dense liquid component is located within the separator adjacent the denser liquid component outlet.

18 Claims, 4 Drawing Sheets

CYCLONE SEPARATOR

This invention relates to a cyclone separator.

In one aspect the present invention relates to a cyclone separator having an elongate separating chamber with means for tangentially introducing liquid mixture thereinto so that a less dense component of the mixture tends to form a lengthwise extending central core in the separating chamber, said core being surrounded by a denser component of the mixture and wherein the separating chamber is so configured as to cause the less dense component in at least an end part of said central core to be urged to flow in a first direction to a first outlet of the separating chamber, at an end of the separating chamber adjacent said inlet means, and whereby the denser component is urged to flow in an opposite direction to a second outlet at the end of the separating chamber opposite said first outlet.

The movement of the less dense component towards the first outlet arises because of pressure differential along the central core. However, a difficulty is experienced in operating cyclone separators of the above kind under certain conditions where the fluid pressure applied to the central core of the less dense mixture component in the separating chamber is insufficient to all points along the length thereof to drive the less dense mixture component in that core to the first outlet. In that case, the less dense component in the core, at a location towards the second outlet, may tend to be driven out the second outlet with the more dense component, thus reducing separating efficiency. This is particularly significant in cases where it is desirable to remove oil from an oily water mixture and where the desired end result is to achieve a clean water flow from the second outlet. Occurrence of the phenomena just described may be sufficient to render it impossible under some conditions to obtain a satisfactory low oil level in the outlet water.

According to the present invention a cyclone separator as above described is characterised by the provision of a third outlet from said separating chamber and located towards said opposite end of said separating chamber to in use receive flow of said less dense component, in said opposite direction, from a portion of said core remote from said end part thereof. The third outlet may conveniently be formed in a duct, coaxially arranged within said separating chamber adjacent said second outlet, such as coaxially therewithin, and extending from said second outlet a predetermined distance towards said first outlet.

In order to assist movement of less dense component through said third outlet, the third outlet may be provided with means for applying a reduced pressure thereat. In any event, a return duct may be provided for returning flow to the separating chamber such as adjacent to the first outlet.

The separating chamber may include first, second, and third coaxially arranged cylinder portions arranged in that order from the first outlet to the second outlet, with the inlet means provided at the first portion. These portions may be of decreasing cross sectional size, from the first to the second to the third such portion. The portions of the cyclone separator may not be truly cylindrical, in the sense that they do not need in all cases to present a side surface which is linear in cross-section and parallel to the axis thereof. The first cylindrical portion may have a frustoconical section adjacent the second cylindrical portion and which provides a taper between the largest diameter of the first cylindrical portion and the diameter of the second cylindrical portion where this meets the first cylindrical portion. A similar section of frustoconical form may be provided to cause a tapering in the diameter of the second cylindrical portion from a largest diameter of the second cylindrical portion to the diameter of the third cylindrical portion. The second cylindrical portion may also exhibit a constant taper over its whole length. A fourth portion may also be added adjacent the third portion.

The invention is further described by way of example only with reference to the accompanying drawing in which.

Figure 1:
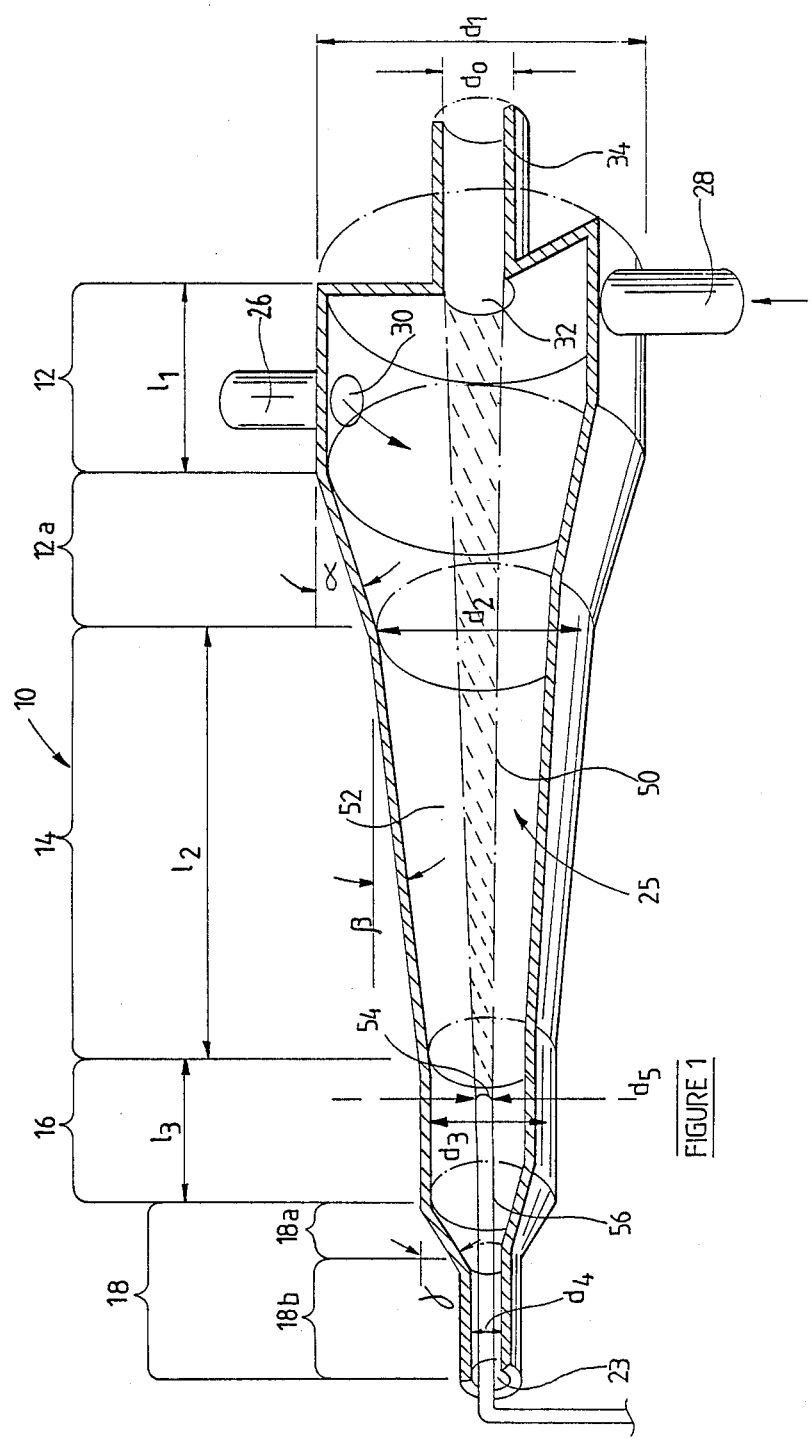
FIG. 1 is a cutaway perspective view of a cyclone separator constructed in accordance with the present invention.

The separator 10 shown in FIG. 1 has a separating chamber 25 having first, second and third cylindrical portions 12, 14 and 16 coaxially arranged in that order. These cylindrical portions are generally similar to the corresponding first, second and third cylindrical portions of the separating chamber of the cyclone separator described in U.S. Pat. No. 4,237,006, the disclosures of which are hereby incorporated into the present specification to form part thereof. The first cylindrical portion 12 has two feed pipes 26, 28 associated therewith, these being arranged to feed tangentially into the cylindrical portion 12 via respective inlet apertures of which only one aperture, namely aperture 30 associated with pipe 26, is visible in the drawing. The two feed inlet apertures are diametrically arranged one relative to the other and positioned close to the end of portion 12 remote from portion 14. The end of portion 12 remote from portion 14 also has a circular first or overflow outlet 32 which leads to an overflow outlet pipe 34.

A tapered part 12a of the separating chamber is positioned between the first and second cylindrical portions 12, 14, towards the second cylindrical portion 14, although such tapered section is not essential.

The second cylindrical portion 14 exhibits a taper over its length, tapering from a diameter at the end adjacent part 12a equal to the diameter of part 12a at the junction between the two portions to a somewhat lesser dimension at its opposite end. Cylindrical portion 16 is of constant diameter equal to the minimum diameter of portion 14.

In the FIG. 1, the length $l_1$ of portion 12, its diameter $d_1$, the taper angle $\alpha$ of the tapered part 12a, the internal diameter $d_o$ of the outlet pipe 34, the length and diameter $l_2$, $d_2$ of the second portion 14, the taper angle B of the second portion 14 and the length $l_3$ and diameter $d_3$ of the third cylindrical portion, as well as the total area $A_i$ of the two feed inlet apertures 30 may all be selected as follows, in accordance with parameters mentioned in U.S. Pat. No. 4,237,006:

$$10 \leq l_2/d_2 \leq 25$$

$$0.04 \leq 4A_i/\pi d_1^2 \leq 0.10$$

$$0.1 \leq d_o/d_2 \leq 0.25$$

$$d_1 > d_2$$

$$d_2 > d_3$$

However, not all these parameters need necessarily be so constrained. For example the outlet diameter $d_o$ need not constrained to the above limits as described therein.

As described in the specification of International Patent Application PCT/AU83/00028, a portion may be added to the separating chamber 25, this portion being designated by reference numeral 18 in the figure. Portion 18 has a part 18a adjacent portion 16 which is of frustoconical configuration, tapering from a maximum diameter equal to $d_3$ at its end closest to and adjoining to the outlet end of cylindrical portion 16, to a diameter $d_4$ at its outlet end. At the outlet end of part 18a, fourth portion 18 includes an outlet pipe 18b which is of internal diameter $d_4$, this leading to a second, or underflow, outlet 23.

Preferably, the angle "γ", being the conicity or half-angle of the frustoconical surface of part 18a is about 45°, although angles in the range 30° to 60° are generally satisfactory. In any event, it is preferred that the ratio $d_4/d_3$ be in the range 1:3 to 2:3. The length of part 18a is not critical to the invention and in any event is normally fixed by the selection of the aforementioned ratio of diameters $d_4$ to $d_3$. Likewise, the length of the pipe 18b has not been found to be important to the operation of the invention.

Although part 18a is shown as having a truly frustoconical cross-sectional from (that is to say it is shown as having a side surface which exhibits a linear sloping configuration relative to the axis of the portion when viewed in section) this is not essential. The part 18 may have a conicity angle which varies along the length thereof such as either increasing or decreasing the direction from the greater diameter end to the lesser diameter end thereof. In any event, it is preferred that the length of the part 18 be roughly the same as the maximum diameter thereof.

In use, liquid to be separated is admitted tangentially to the interior of cylindrical portion 12 via feed pipes 26, 28, the more dense component of the liquid then travelling lengthwise through the separator to emerge from outlet 23 of pipe 18b, whilst the less dense component emerges from pipe 34 via outlet 32.

As shown, the less dense component tends to form a central tapered core designated by reference numeral 50, this being surrounded by the more dense component, designated by reference numeral 52. As shown, core 50 is widest adjacent the overflow outlet and at this location the flow within the core is directed towards the overflow outlet opening 32. However, the flow in the central core at the opposite end thereof, being the end adjacent the underflow outlet 23 of the separator, may not be wholly so-directed and in fact may exhibit a reverse flow tending to cause the less dense component at that end of the core to mingle with and be expressed from the underflow outlet 23 together with the denser component, thus reducing the separating efficiency. In accordance with this invention, then, there is provided, in the separating chamber 25 at the end opposite the outlet 32, a third outlet 54 which is designed to receive and transmit exteriorily of the separator any such of the less dense component within the core 50 which is tending to flow in the aforementioned direction towards the underflow outlet. As shown, this outlet 54 is provided at the free end of duct 56 which extends coaxially within the cylindrical portions 16 and 18. Where the portion 18 is not provided, however, duct 56 may simply extend within the portion 16. The length of the tube should be sufficient such that the outlet 54 is positioned at the place relative to core 50 where flow in the direction towards the underflow outlet first starts to occur in use of the separator. In an exemplary arrangement constructed in accordance with the invention, the separator did not have the portion 18, the portions 12, 14, and 16 being of lengths $l_1 = 116$ mm, $l_2 = 1250$ mm, and $l_3 =$ approximately 1000 mm. The tapered part 12a was provided, this being of length about 160 mm. The first, second and third cylindrical portions had diameters as follows:

first cylindrical portion, diameter $d_1$, 116 mm, second cylindrical portion 14; diameter 58 mm at diameter $d_2$ tapering to 27 mm at diameter $d_3$, cylindrical portion 16, diameter $d_3$, 27 mm. The apertures 30 had diameters of 20 mm with the overflow outlet 32 being of diameter 2.5 mm. In this instance, the duct 56 extended from the underflow outlet as defined by the free end of cylindrical portion 16 coaxially within the separating chamber towards the outlet 32 a distance of 30 mm. The inside diameter $d_5$ of the duct 56 was 13 mm.

In another experimental arrangement, the duct 56 was of length 80 mm and of inside diameter $d_5$, 9 mm. In practice, the diameter may be selected to be about 5 mm in arrangements otherwise as above described, this representing a diameter ratio for the inside diameter $d_5$ of the tube to the diameter $d_3$ of 1:5.4.

Figure 2:
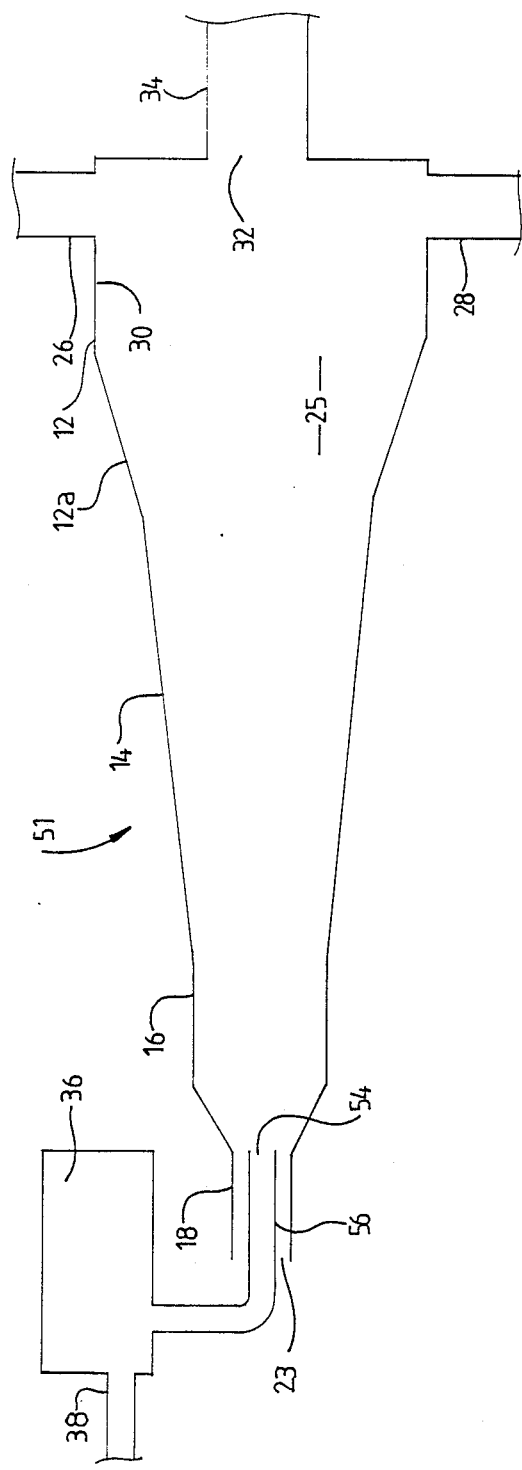
FIG. 2 is a diagrammatic axial section of a further cyclone separator constructed in accordance with the invention.

FIG. 2 shows a separator 51 like that in FIG. 1 save that, here, the duct 56 is connected, at an end exterior to the separating chamber 25, to a positive displacement vacuum pump 36, to apply a reduced pressure to the interior of the duct 56, and thus to the outlet 54, to facilitate flow through the duct 56. Liquid so flowing is expressed from the outlet 38 of the pump.

Figure 3:
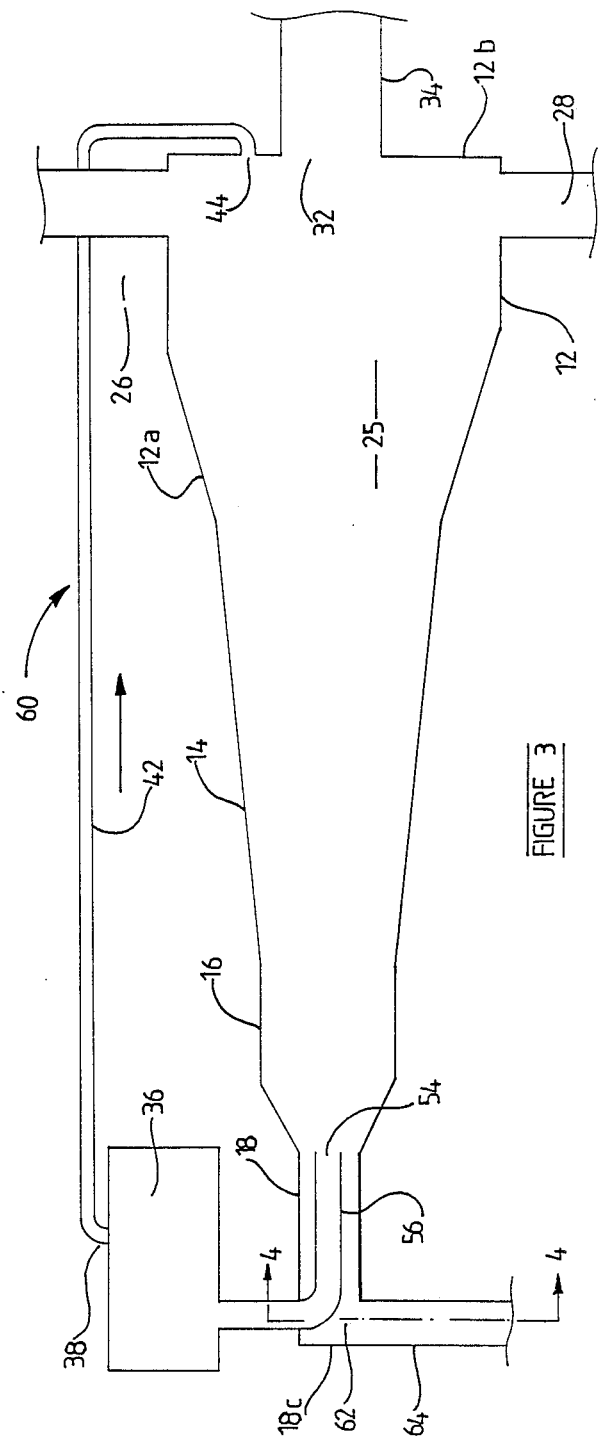
FIG. 3 is a diagrammatic axial section of a still further separator construction in accordance with the invention.
Figure 4:
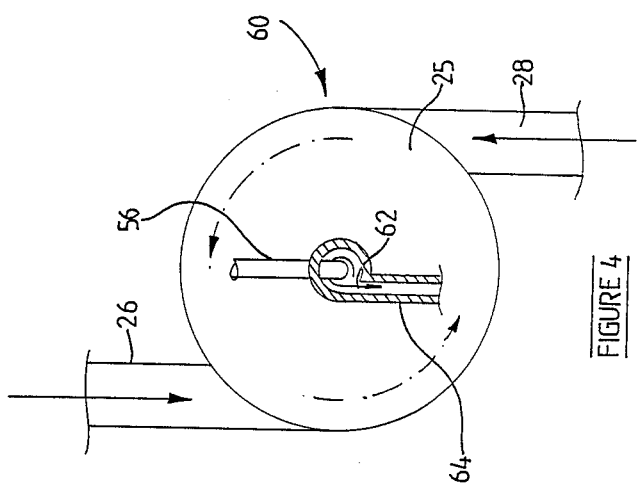
FIG. 4 is a section on the line 4—4 in FIG. 3.

In FIG. 3, a still further, similar, separator 60 is shown wherein pump 36 is provided, the outlet thereof in this instance being connected to a duct 42 which is connected to an inlet 44 to the separating chamber 25. Inlet 44 is positioned in an end wall 12b of portion 12 of the separating chamber and is adjacent overflow outlet 32.

In FIG. 3, the separator 60 is also somewhat modified in that the portion 18 of the separating chamber terminates in a closed wall 18c with the underflow outlet from the separator being provided as an opening 62 to a tangential outlet duct 64 arranged to receive the helical flow of the liquid in separating chamber 25. This helical flow arises because of the tangential positioning of inlet pipes 26, 28.

The described arrangement has been advanced merely by way of explanation and many modifications may be made thereto without departing from the spirit and scope of the invention as defined in the appended claims.

We claim:

1. A cyclone separator comprising elements designed, sized and arranged for treating an oil-water mixture for separating the more dense water component from the less dense oil component thereof, said separator having a separating chamber in the form of an axially extending elongate surface of revolution with first, second and third contiguous portions arranged in that order, the first portion being of greater diameter than the second portion and the third portion being of lesser diameter than the second portion, the second portion being of a length which is at least ten times its diameter adjacent to the first portion, the first portion having an overflow outlet at the end thereof opposite to said second portion and at least one feed inlet arranged for inlet of said mixture to the separating chamber with a tangential component of motion, said separating chamber having an underflow outlet at an end thereof opposite said overflow outlet characterized by the provision of an axially positioned third outlet from said separating chamber and located towards said end of said separating chamber opposite said overflow outlet to in use receive flow of said less dense oil component.

2. A cyclone separator as claimed in claim 1 wherein said third outlet is formed at the end of a duct arranged within said separating chamber adjacent said underflow outlet, and extending from said underflow outlet a predetermined distance in the direction towards said overflow outlet.

3. A cyclone separator as claimed in claim 2 wherein said duct is concentrically positioned within said third portion of the separating chamber.

4. A cyclone separator as claimed in claim 3 wherein means is provided for providing a reduced pressure at said third outlet to facilitate outflow of said less dense oil component through said third outlet.

5. A cyclone separator as claimed in claim 2 wherein means is provided for providing a reduced pressure at said third outlet to facilitate said flow of said less dense oil component through said third outlet.

6. A cyclone separator as claimed in claim 2 wherein said duct is concentrically positioned within said third portion of the separating chamber adjacent to said underflow outlet, and extending from said underflow outlet a predetermined distance in the direction towards said overflow outlet and communicates with said separating chamber adjacent to said overflow outlet.

7. A cyclone separator as claimed in claim 1 wherein means is provided for providing a reduced pressure at said third outlet to facilitate outflow of said less dense oil component through said third outlet.

8. A cyclone separator as claimed in claim 7 wherein said third outlet communicates with said separating chamber adjacent said overflow outlet.

9. A cyclone separator as claimed in claim 7 wherein the means for providing a reduced pressure comprises a positive displacement vacuum pump.

10. A cyclone separator as claimed in claim 1 wherein a return duct is provided to return liquid entering said third outlet to the separating chamber.

11. A cyclone separator as claimed in claim 10 wherein said third outlet communicates with said separating chamber adjacent said overflow outlet.

12. A cyclone separator as claimed in claim 1 wherein said third outlet is formed at the end of a duct arranged within said separating chamber adjacent said underflow outlet, and extending from said underflow outlet a predetermined distance in the direction towards said overflow outlet and communicates with said separating chamber adjacent to said overflow outlet.

13. A cyclone separator as claimed in claim 1 wherein said underflow outlet is provided in a side wall of the separating chamber.

14. A cyclone separator as claimed in claim 13 wherein said underflow outlet communicates with a tangential outlet duct.

15. A cyclone separator as claimed in claim 14 wherein said separating chamber is closed by a transverse wall at an end thereof adjacent to said underflow outlet.

16. A cyclone separator as claimed in claim 13 wherein said separating chamber is closed by a transverse wall at an end thereof adjacent to said underflow outlet.

17. A cyclone separator comprising elements designed, sized and arranged for treating an oil-water mixture for separating the more dense water component from the less dense oil component thereof, said separator having a separating chamber with an overflow outlet at one end thereof, at least one feed inlet arranged for inlet of said mixture to the separating chamber at said end, said separating chamber having an underflow outlet at an end thereof opposite said overflow outlet, an axially positioned third outlet from said separating chamber and located towards said end of said separating chamber opposite said overflow outlet to in use receive flow of said less dense oil component, means for providing a reduced pressure at said third outlet to facilitate outflow of said less dense oil component therethrough, and a duct concentrically positioned within said third outlet.

18. A cyclone separator as claimed in claim 17 wherein said means for providing a reduced pressure at said third outlet comprises a positive displacement vacuum pump.

* * * * *